United States Patent [19]

Quinn et al.

[11] 4,124,652

[45] Nov. 7, 1978

[54] THERMOPLASTIC MOLDING COMPOSITION

[75] Inventors: Clayton B. Quinn, Pittsfield; John A. Rock, Dalton, both of Mass.

[73] Assignee: General Electric Company, Pittsfield, Mass.

[21] Appl. No.: 750,555

[22] Filed: Dec. 14, 1976

[51] Int. Cl.² ............................................. C08L 67/02
[52] U.S. Cl. ................... 260/860; 260/40 R; 528/346; 528/202
[58] Field of Search ............... 260/860, 47 XA, 40 R, 260/75 R

[56] References Cited

U.S. PATENT DOCUMENTS

| 3,131,148 | 4/1964 | Taulli ................................. 260/40 R |
| 3,835,089 | 9/1974 | Fox et al. ............................ 260/860 |
| 3,915,926 | 10/1975 | Wambach ......................... 260/40 R |
| 3,931,094 | 1/1976 | Segal et al. ....................... 260/40 R |

*Primary Examiner*—Hosea E. Taylor
*Assistant Examiner*—Amelia B. Yarbrough
*Attorney, Agent, or Firm*—Myron B. Kapustij; William F. Mufatti

[57] ABSTRACT

A thermoplastic molding composition comprising a chlorine containing bisphenol polycarbonate and a polyester derived from a cyclohexanedimethanol.

11 Claims, No Drawings

THERMOPLASTIC MOLDING COMPOSITION

This invention is directed to a novel thermoplastic molding composition comprising a chlorine containing bisphenol polycarbonate and a polyester resin derived from cyclohexanedimethanol. This composition may additionally contain a reinforcing amount of a reinforcing filler.

BACKGROUND OF THE INVENTION

Polycarbonates are well known and have been widely employed for the production of thermoplastic molded articles.

Polycarbonate derived from bisphenol-A is a high-performance plastic with good impact strength. In addition to ductility (impact strength), general-purpose polycarbonate has high transparency, wide temperature limits (high impact resistance below $-60°$ C. and a UL thermal endurance rating of $115°$ C. with impact), good dimensional stability, high creep resistance and electrical properties which qualify it as sole support for current carrying parts (up to $125°$ C. without loss of impact strength).

Flame retardant polycarbonates have a wide range of applications. Polycarbonates are rendered flame retardant by a host of various additives. Some of these additives detrimentally affect one or more of the physical properties of polycarbonates.

A particularly effective flame retardant polycarbonate is a chlorine containing bisphenol polycarbonate in which the phenol moieties of the bisphenol are linked in the 1,1- positions to 2,2-dichloroethylene. These chlorine containing bisphenol polycarbonates have very good resistance to burning and smoke formation while retaining the physical properties of polycarbonates. However, these chlorine containing bisphenol polycarbonates require high processing temperatures and, at these temperatures, thermal cracking may result in loss of chlorine and a viscosity buildup and degradation of the composition. This degradation is shown by color formation and mold corrosion. Also, these chlorine containing bisphenol polycarbonates exhibit U.V. unstability.

DESCRIPTION OF THE INVENTION

It has been discovered that when a polyester derived from cyclohexanedimethanol is added to a chlorine containing bisphenol polycarbonate, the resultant composition retains its good resistance to burning and smoke formation and, additionally, requires a lower processing temperature. This lower processing temperature produces a more stable composition since there is no tendency for chlorine to be given off at this lower temperature. Moreover, the composition retains clarity and impact resistance. Also, surprisingly, the composition of the instant invention has reduced melt viscosity as compared to the chlorine containing bisphenol polycarbonate, which results in easier molding. Further, it has been found that the instant composition has enhanced U.V. stability as compared to a chlorobisphenol polycarbonate.

The instant thermoplastic molding composition comprises:

(a) a chlorine containing bisphenol polycarbonate; and (b) a polyester polymer derived from cyclohexanedimethanol.

In a preferred embodiment, the instant thermoplastic composition comprises:

(a) a chlorine containing bisphenol polycarbonate;

(b) a polyester polymer derived from cyclohexanedimethanol; and (c) a reinforcing amount of a reinforcing filler.

The chlorine containing bisphenol polycarbonate of the instant invention has recurring units of the following formula:

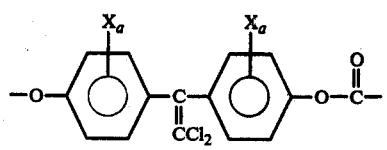

wherein X is independently selected from halogen or an alkyl radical of 1 to 4 carbon atoms and wherein $a$ is an integer of 0 to 4.

These chlorine containing bisphenol polycarbonates may be prepared by methods well known in the art, as for example, reacting 1,1-dichloro-2,2-bis(p-hydroxy phenyl) ethylene with a carbonate precursor. Methods for producing polycarbonates are described in U.S. Pat. No. 3,989,672, which is incorporated herein by reference.

The chlorine containing bisphenol polycarbonates of the instant invention also include copolymers, with mixtures of bisphenols of the following formula:

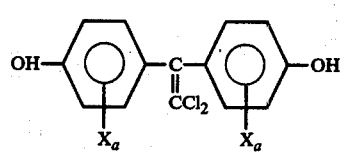

II.

and

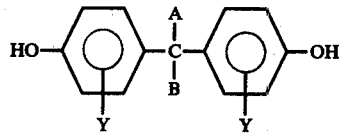

III.

wherein X and $a$ are defined as above and Y is independently selected from one or more halogen and alkyl radicals; A and B are selected from the group consisting of hydrogen, hydrocarbon radicals free from aliphatic unsaturation and of radicals which, together with the adjoining

atom, form a cycloalkane radical, the total number of carbon atoms in A and B being up to 12.

This mixture of bisphenols is reacted with a carbonate precursor such as phosgene, for example, by well known methods in the art. The preferred bisphenol in III is bisphenol-A.

The chlorine containing bisphenol polycarbonate should have an intrinsic viscosity between 0.3 and 1.0, preferably from 0.40 to 0.65 as measured at $25°$ C. in methylene chloride.

The instant polyesters are prepared by condensing either the cis- or trans-isomer (or a mixture thereof) of 1,4-cyclohexanedimethanol with a hexacarbocyclic dicarboxylic acid so as to produce a polyester having recurring units having the following formula:

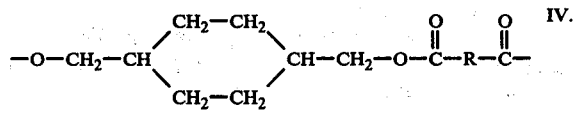

IV.

wherein the substituted cyclohexane ring is selected from the group consisting of the cis- and trans-isomers thereof and R represents an organic radical containing from 6 to 20 carbon atoms which is the decarboxylated residue derived from a hexacarbocyclic dicarboxylic acid.

The preferred polyester resins may be derived from the reaction of either the cis- or trans-isomer (or a mixture thereof) of 1,4-cyclohexanedimethanol with a mixture of iso- and terephthalic acids. These polyesters have recurring units of the formula:

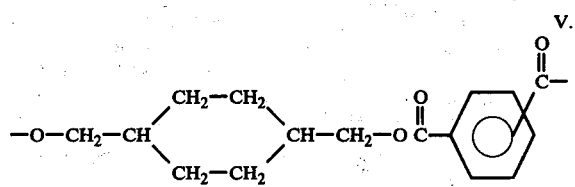

V.

These polyesters can be produced by well known methods in the art such as those set forth in U.S. Pat. No. 2,901,466 which is incorporated herein by reference.

Of course, it is understood that the polyester resins of this invention can be prepared by condensing 1,4-cyclohexanedimethanol and minor amounts of other bifunctional glycols with the hexacarbocyclic dicarboxylic acid. These other bifunctional glycols include the polymethylene glycols containing from 2 to 10 or more carbon atoms such as ethylene glycol, butylene glycol, etc.

Examples of hexacarbocyclic dicarboxylic acids wherein the carboxy radicals are attached in para relationship to a hexacarbocyclic residue indicated by R in Formula IV, include terephthalic acid, trans-hexhydroterephthalic acid, p,p-sulfonyldibenzoic acid, 4,4'-diphenic acid, 4,4'-benzophenonedicarboxylic acid, 1,2-di(p-carboxyphenyl) ethane, 1,2-di(p-carboxyphenoxy) ethane, 4,4'-dicarboxydiphenyl ether, etc. and mixtures of these. All of these acids contain at least one hexacarbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acid is terephthalic acid, or mixtures of terephthalic and isophthalic acids.

These polyesters should have an intrinsic viscosity between 0.40 and 2.0 dl./g. measured in a mixture of 40% tetrachloroethane/60% phenol solution or a similar solvent at 25° C.-30° C. Especially preferred polyester will have an intrinsic viscosity in the range of 0.6 and 1.2 dl./g.

The reinforcing agents may be selected from finely divided aluminum, iron or nickel and the like, metal oxides and non-metals, such as carbon filaments, silicates, such as mica, aluminum silicate (clay), talc, asbestos, titanium dioxide, Wollastonite, novaculite, potassium titanate and titanate whiskers, glass flakes, glass beads and fibers, and polymeric fibers and combinations thereof.

Although it is only necessary to use a reinforcing amount of the reinforcing agent, from 1-60 parts by weight of the total weight of the composition may comprise the reinforcing agent. A preferred range is from 5-40 parts by weight.

The preferred reinforcing agents are of glass, and it is preferred to use fibrous glass filaments, mixtures of glass and talc, glass and mica and glass and aluminum silicate, for example. The preferred filaments for plastics reinforcement are made by mechanical pulling. Preferably, the glass filament diameters range from about 0.00012 to about 0.00075 inch, but this is not critical to the present invention.

The chlorine containing bisphenol polycarbonate may comprise from 1 to 99 parts by weight of the composition and the polyester resin derived from cyclohexanedimethanol resin may comprise from 99 to 1 parts by weight of the composition. Preferably, the chlorine containing bisphenol polycarbonate comprises from 25 to 98 parts by weight of the composition and the polyester derived from cyclohexanedimethanol comprises from 2 to 75 parts by weight of the composition.

The instant composition may be prepared by any standard procedure and the particular method employed is not critical. For example, pellets made from the polycarbonate resin can be blended with pellets made from the instant polyester resin in an extruder under standard conditions.

Obviously, other materials can also be employed with the composition of this invention and include such materials as antistatic agents, pigments, mold release agents, thermal stabilizers, flame retardants, impact modifiers, extenders, adjuvants, UV stabilizers, nucleating agents, foaming agents and the like.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

The following ingredients are dried:

a chlorine containing bisphenol copolycarbonate prepared from a mixture of 85 percent 1,1-dichloro-2,2-bis(p-hydroxy phenyl ethylene) and 5 percent bisphenol-A and phosgene, intrinsic viscosity 0.50 dl./g. measured in methylene chloride at 25° C. (Polymer A).

poly(1,4-cyclohexanedimethanol terephthalate-co-isophthalate), intrinsic viscosity 0.74 dl./g. measured in a 60/40 phenol tetrachloroethane solution at 30° C. (Polymer B). (KODAR A150, Eastman Chemical Products).

The blends are compounded in an extruder at 500° F. to 540° F. The extrudate is pelletized and the pellets are injection molded at 550° F. into ASTM test bars in a standard machine. The test bars are tested for the following physical properties: Heat Distortion, ASTM D-648; Tensile Strength and Tensile Elongation, ASTM D-1708; Izod Impact, ASTM D-256; Falling Dart Gardner Impact; Flexural Strength and Flexural Modulus, ASTM D-790; Melt Index, ASTM D-1238 at 300° C., 100 psi pressure and a load of 5000 grams on molded parts; Oxygen Index, ASTM D-2863 and UL Standard 94.

The formulations are set forth below, while the results are set forth in the Table.

| Example | I | II | III | IV |
|---|---|---|---|---|
| Polymer A | 100 | 90 | 75 | 50 |
| Polymer B |  | 10 | 25 | 50 |

TABLE

|  | I | II | III | IV |
|---|---|---|---|---|
| Heat distortion temperature, ° C at 264 psi | 134 | 137 | 122 | 111 |
| Tensile strength at yield, psi | 11,140 | 11,180 | 10,620 | 8,790 |
| Tensile elongation, per cent | 60 | 102 | 87 | 150 |
| Izod impact, notched, ft.lb./in. | 3.2 | 2.0 | 1.9 | 1.6 |
| Gardner impact, in.lbs. | >560 | >560 | >560 | >560 |
| Flexural strength, psi | 14,250 | 15,030 | 14,250 | 13,860 |
| Flexural modulus, psi × 10$^{-3}$ | 368 | 349 | 366 | 364 |
| Melt Index, poises | 26,000 | 13,000 | 9,800 | 2,700 |
| Oxygen Index, per cent | 56 | 43 | 34 | 22 |
| UL-94 | V-0 | V-0 | V-0 | Burns |

As seen from the Table, the melt viscosity of the polycarbonate composition is reduced by adding the polyester without substantially affecting the physical properties of the polycarbonate composition. This reduced melt viscosity requires lower processing temperature.

Although the above examples have shown various modifications of the present invention, other variations are possible in the light of the above teachings. It is, therefore, to be understood that changes may be made in the particular embodiments of the invention described which are within the full intended scope of the invention as defined by the appended claims.

What is claimed is:

1. A thermoplastic molding composition which consists essentially of:
    (a) a chlorine containing bisphenol polycarbonate derived from a bisphenol of the following formula:

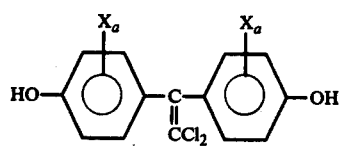

wherein X is independently selected from halogen or an alkyl radical of 1 to 4 carbon atoms and $a$ is an integer of 0 to 4;
    (b) a polyester polymer derived from cyclohexanedimethanol and hexacarbocyclic dicarboxylic acid.

2. A thermoplastic molding composition as defined in claim 1 wherein the polycarbonate is a copolycarbonate of a mixture of bisphenols of the following formula:

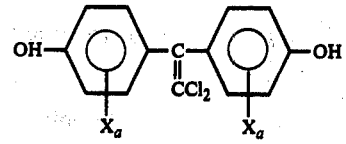

and

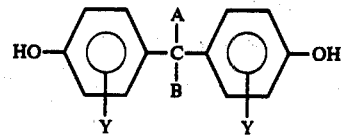

wherein X and $a$ are defined as above and Y is independently selected from one or more halogen and alkyl radicals; A and B are selected from the group consisting of hydrogen, hydrocarbon radicals free from aliphatic unsaturation and of radicals which, together with the adjoining

atom, form a cycloalkane radical, the total number of carbon atoms in A and B being up to 12.

3. A thermoplastic molding composition as defined in claim 1 wherein the polyester polymer has repeating units of the formula:

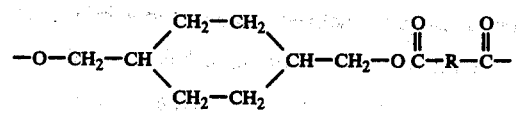

wherein the substituted cyclohexane ring is selected from the group consisting of the cis- and trans-isomers thereof and R represents an organic radical containing from 6 to 20 carbon atoms which is the decarboxylated residue derived from a hexacarbocyclic dicarboxylic acid.

4. A thermoplastic molding composition as defined in claim 3 wherein the polyester polymer has the repeating unit:

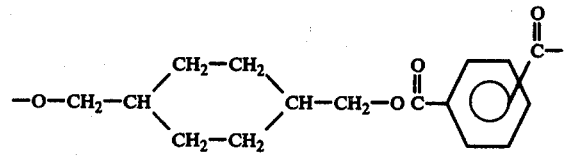

5. A thermoplastic molding composition which consists essentially of:
    (a) from 25 to 98 parts by weight of a chlorine containing bisphenol polycarbonate derived from a bisphenol of the following formula:

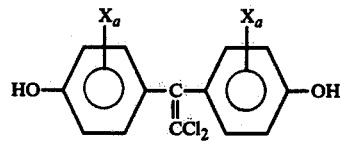

wherein X is independently selected from halogen or an alkyl radical of 1 to 4 carbon atoms and $a$ is an integer of 0 to 4;

(b) from 2 to 75 parts by weight of a polyester polymer derived from cyclohexanedimethanol and hexacarbocyclic dicarboxylic acid;

(c) from 1 to 60 parts by weight of a reinforcing filler.

6. A thermoplastic molding composition as defined in claim 5 wherein the polycarbonate is a copolycarbonate of a mixture of bisphenols of the following formula:

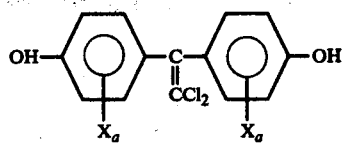

and

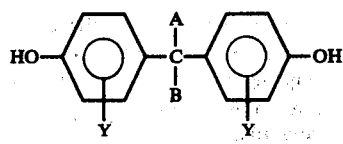

wherein X and $a$ are defined as above and Y is independently selected from one or more halogen and alkyl radicals; A and B are selected from the group consisting of hydrogen, hydrocarbon radicals free from aliphatic unsaturation and of radicals which, together with the adjoining

atom, form a cycloalkane radical, the total number of carbon atoms in A and B being up to 12.

7. A thermoplastic molding composition as defined in claim 5 wherein the polyester polymer has repeating units of the formula:

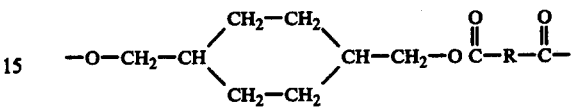

wherein the substituted cyclohexane ring is selected from the group consisting of the cis- and trans- isomers thereof and R represents an organic radical containing from 6 to 20 carbon atoms which is the decarboxylated residue derived from a hexacarbocyclic dicarboxylic acid.

8. A thermoplastic molding composition as defined in claim 7 wherein the polyester polymer has the repeating unit:

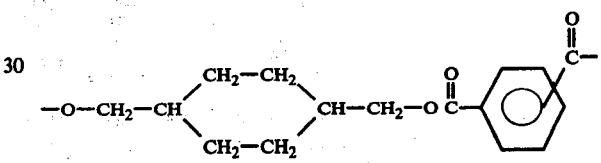

9. The composition as defined in claim 5 wherein the reinforcing filler is glass filler.

10. The composition as defined in claim 5 wherein the reinforcing filler is glass and mica.

11. The composition as defined in claim 5 wherein the reinforcing filler is glass and talc.

* * * * *

UNITED STATES PATENT AND TRADEMARK OFFICE
CERTIFICATE OF CORRECTION

PATENT NO. : 4,124,652
DATED : November 7, 1978
INVENTOR(S) : Clayton Byerley Quinn and John Andrew Rock It is certified that error appears in the above-identified patent and that said Letters Patent are hereby corrected as shown below:

Col. 4, line 58, "5 percent" should be -- 15 percent --

Signed and Sealed this

Thirteenth Day of February 1979

[SEAL]

Attest:

RUTH C. MASON
*Attesting Officer*

DONALD W. BANNER
*Commissioner of Patents and Trademarks*